United States Patent
Rank et al.

(10) Patent No.: US 10,010,927 B2
(45) Date of Patent: Jul. 3, 2018

(54) APPARATUS FOR SMOOTHING A TOOTHING SYSTEM AND PRODUCTION PROCESS

(71) Applicant: ZF FRIEDRICHSHAFEN AG, Friedrichshafen (DE)

(72) Inventors: Bernhard Rank, St. Ingbert (DE); Jan-Michael Buck, Friedrichshafen (DE); Heinz-Guenther Hilpert, Alsting (FR)

(73) Assignee: ZF Friedrichshafen AG, Friedrichshafen (DE)

( * ) Notice: Subject to any disclaimer, the term of this patent is extended or adjusted under 35 U.S.C. 154(b) by 404 days.

(21) Appl. No.: 14/902,805

(22) PCT Filed: Jun. 3, 2014

(86) PCT No.: PCT/EP2014/061414
§ 371 (c)(1),
(2) Date: Jan. 4, 2016

(87) PCT Pub. No.: WO2015/000652
PCT Pub. Date: Jan. 8, 2015

(65) Prior Publication Data
US 2016/0175917 A1    Jun. 23, 2016

(30) Foreign Application Priority Data

Jul. 4, 2013  (DE) .................. 10 2013 213 056
Feb. 20, 2014  (DE) .................. 10 2014 203 088

(51) Int. Cl.
*B21H 5/02* (2006.01)
*B23P 9/02* (2006.01)
*B24B 39/00* (2006.01)
*C21D 7/08* (2006.01)
*B23F 21/00* (2006.01)
(Continued)

(52) U.S. Cl.
CPC ............. *B21H 5/022* (2013.01); *B21H 5/025* (2013.01); *B23F 19/00* (2013.01); *B23F 21/00* (2013.01); *B23P 9/02* (2013.01); *B23P 15/14* (2013.01); *B24B 39/00* (2013.01); *C21D 7/08* (2013.01); *B21H 5/02* (2013.01); *C21D 9/32* (2013.01)

(58) Field of Classification Search
CPC .......... B21H 5/02; B21H 5/022; B21H 5/025; B23P 15/14; B23P 9/02; B23B 39/00; C21D 7/08; C21D 9/32; B23F 21/00; B23F 19/00
See application file for complete search history.

(56) References Cited

U.S. PATENT DOCUMENTS 4,309,802 A    1/1982  Jorgensen

FOREIGN PATENT DOCUMENTS

| DE | 199 63 477 | 7/2001 |
|---|---|---|
| DE | 10 2007 039 959 | 2/2009 |
| EP | 0 366 074 | 5/1990 |

*Primary Examiner* — Moshe Wilensky
(74) *Attorney, Agent, or Firm* — Cozen O'Connor

(57) ABSTRACT

An apparatus for smoothing an inner toothing and/or an outer toothing of a component part. At least two radially adjustable smoothing gears, which engage in the inner toothing and/or outer toothing, are rotatably arranged inside the inner toothing and/or outside of the outer toothing. During smoothing, the component part is not firmly clamped but rather only rests loosely on a support. A thrust ring is provided at least at one of the smoothing gears for limiting axial movements of the component part, which occur during smoothing.

19 Claims, 3 Drawing Sheets

(51) Int. Cl.
  *B23F 19/00* (2006.01)
  *B23P 15/14* (2006.01)
  *C21D 9/32* (2006.01)

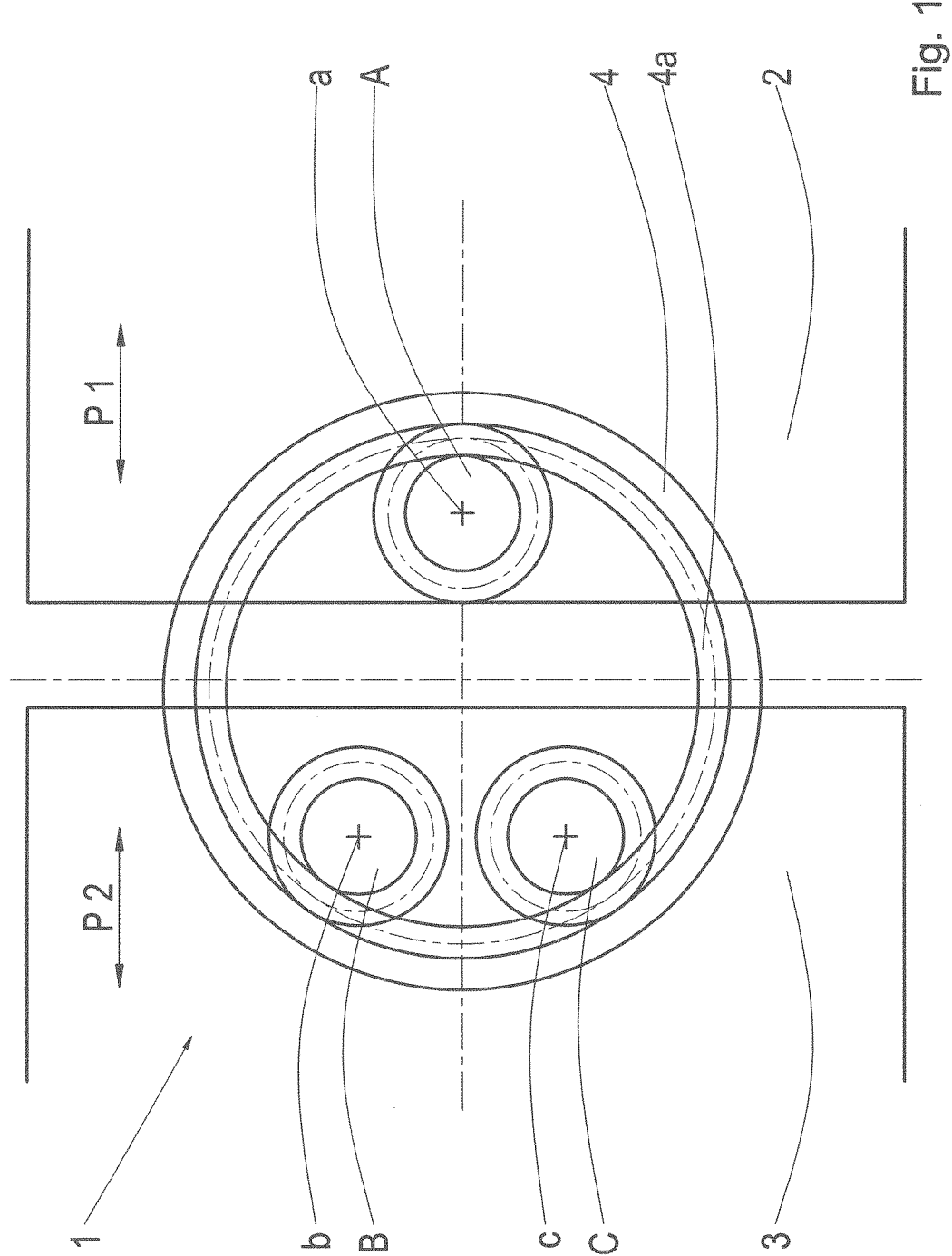

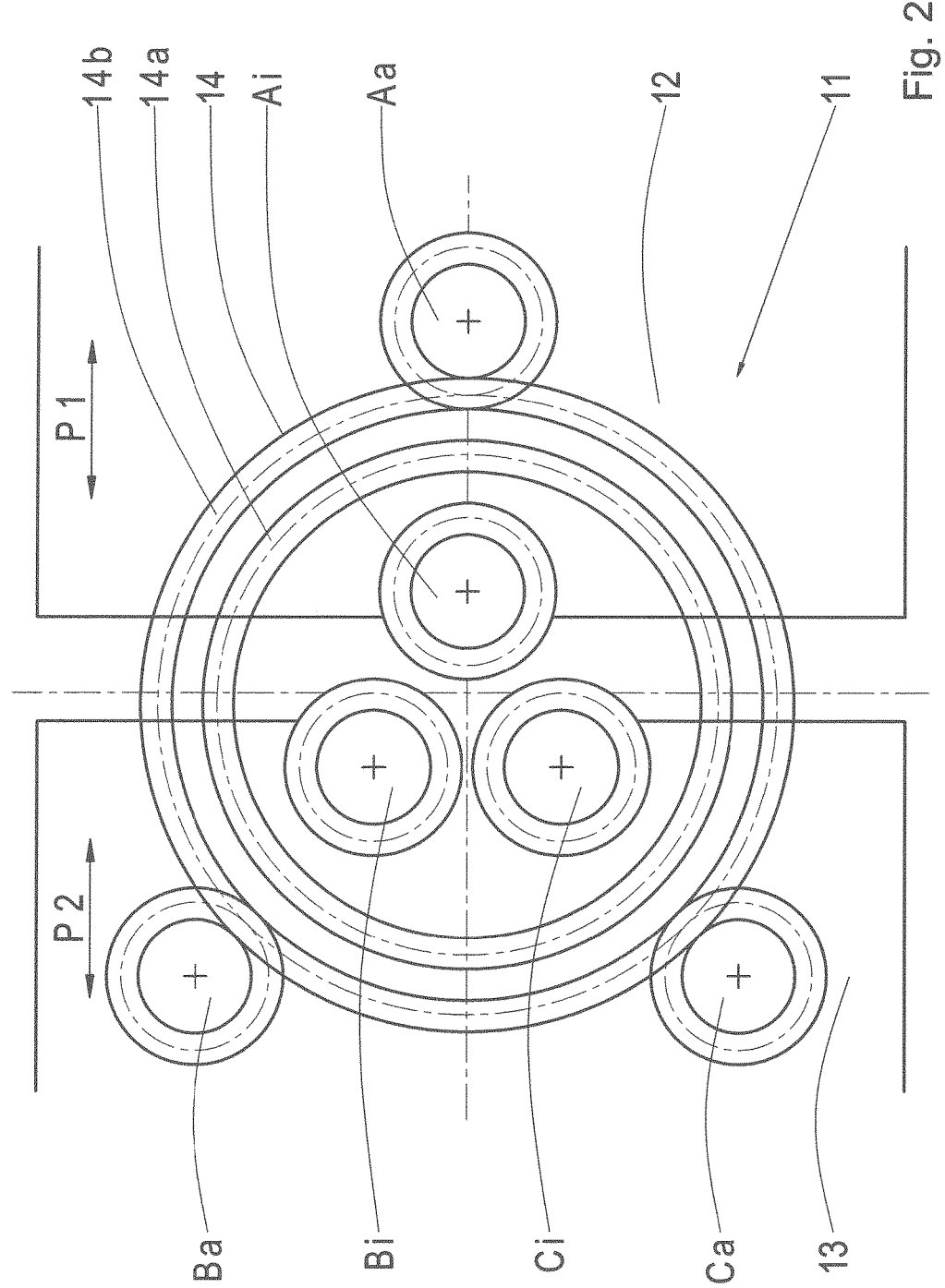

APPARATUS FOR SMOOTHING A TOOTHING SYSTEM AND PRODUCTION PROCESS

CROSS REFERENCE TO RELATED APPLICATIONS

This is a U.S. national stage of application No. PCT/EP2014/061414, filed on Jun. 3, 2014. Priority is claimed on German Application Nos.: 10 2013 213 056.2, filed Jul. 4, 2013; 10 2014 203 088.9, filed Feb. 20, 2014, the contents of which are incorporated here by reference.

BACKGROUND OF THE INVENTION

1. Field of the Invention

The invention is directed to an apparatus for smoothing an inner toothing and/or an outer toothing according and to a method for producing an inner toothing and/or outer toothing.

2. Detailed Description of the Prior Art

It is known that the inner teeth of ring gears are initially machined by broaching and, in the case of helical teeth, by helical broaching. As a result of the broaching process, pointed ridge-shaped structures occur on the surface of the tooth flanks leading to unwanted surface roughness on the tooth flanks. Excessive surface roughness is one of the causes of micropitting, or pitting, which develops on the tooth flanks during operation of the gears. It is also known that the surface roughness produced by chip-removing machining can be reduced by smoothing. In this smoothing process, the profile peaks of the rough surface are smoothed by deformation. This can improve the surface quality of the tooth flanks and eliminate a cause of micropitting.

A device for smoothing an inner toothing of a ring gear is known from DE 199 63 477 A1. The device comprises three machining units which are offset by 90° with respect to one another and which have a smoothing gear in each instance. The ring gear is clamped in a holder and swiveled by 90-degree increments on a revolving table so as to run through the three machining stations. The smoothing gears are meshed to the inner toothing of the ring gear on each of the three machining stations and accordingly effect a smoothing of the inner toothing successively, i.e., in three temporally and spatially consecutive steps. The smoothing gear is advanced radially from the inner side to the outer side in each instance, for which purpose a pressing force is applied by disk springs. The smoothing gears are driven in each instance by a motor and roll along the inner toothing and are simultaneously oscillated in axial direction. The three smoothing gears of the different machining stations are directed to different portions of the tooth flanks.

It is also known, e.g., from DE 10 2007 039 959 A1, to smooth-roll an outer toothing of a gear through two diametrically disposed round rolling tools.

SUMMARY OF THE INVENTION

It is an object of one aspect of the present invention to improve and simplify an apparatus of the type mentioned in the introductory part and to suggest a method which can preferably be implemented with the apparatus.

According to a first aspect of the invention, the apparatus comprises at least two radially adjustable smoothing gears that engage in the inner toothing and/or outer toothing and which are arranged inside and/or outside of the component part. The smoothing gears are accordingly arranged not on different machining stations but rather in an individual machining station for smoothing the inner toothing and/or outer toothing. Therefore, the apparatus becomes considerably simpler and more compact. The pressing forces or feed forces are substantially lower compared to the prior art.

Preferably the component part to be machined is not firmly clamped in the apparatus during smoothing but rather only rests loosely on a support during smoothing. It is also preferable that a thrust ring is provided at least at one—preferably at all—of the smoothing gears for limiting axial movements of the component part which occur during smoothing.

One embodiment advantageously allows the smoothing gears (tools) to engage with the component part to be machined (workpiece) with low axial backlash of a few tenths of a millimeter. The floating smoothing gears compensate for the resulting very slight inclined position of the component part to be machined which can occur when the component part rises axially from the support.

In a preferred embodiment, the thrust ring, which is provided for limiting the axial movements of the component part, which is not firmly clamped in, is produced from hardened steel and is fixedly connected to the smoothing gear.

According to a preferred embodiment, three smoothing gears are arranged in each instance so as to be offset relative to one another by 120° inside and/or outside of the component part. Accordingly, the smoothing gears are arranged as planet gears in a planetary gearset, i.e., inside a ring gear and/or outside of a sun gear, and simultaneously engage in the inner toothing and/or outer toothing.

According to a further preferred embodiment, at least one smoothing gear is arranged on a radially movable slide. In this way, the at least one smoothing gear can be advanced radially to the inner toothing and/or outer toothing of the component part.

According to a further preferred embodiment, a first smoothing gear is arranged on a first slide and a second smoothing gear and third smoothing gear are arranged on a second slide, both slides are displaceable diametrically opposite one another. Alternatively, three inner smoothing gears and three outer smoothing gears can also be arranged on two slides. The two slides are preferably displaced inward and/or outward by a centrally arranged displacing unit, i.e., a pneumatic cylinder, such that the smoothing gears can be meshed to the inner toothing and/or outer toothing of the workpiece. Therefore, only one displacing unit is required for the three smoothing gears or six smoothing gears, respectively.

According to a further preferred embodiment, the second smoothing gear and the third smoothing gear are rotatably mounted, the rotational axes being arranged in a floating manner relative to the second slide. In this way, the two smoothing gears can follow the deviations of the inner toothing of the ring gear from the helix angle during smoothing. Therefore, there is a continuous, uniform pressing force between the smoothing gears and the inner toothing.

According to a further preferred embodiment, the first smoothing gear is rotatably mounted and is driven in rotational direction. The rotational axis of the driving smoothing gear is not floating. Therefore, the ring gear is driven, i.e., set in rotation, by the first smoothing gear such that all of the smoothing gears roll along the inner toothing. Therefore, the ring gear, i.e., the workpiece, is centered by the smoothing gears and does not need to be specially held or clamped.

According to a further preferred embodiment, the three smoothing gears or six (three inner and three outer) smoothing gears have teeth with differently corrected tooth profiles. Because of the different tooth profiles, different parts or zones of the tooth flanks are machined consecutively—viewed in profile direction of the inner toothing. Accordingly, a smoothing of the entire tooth profile of the inner toothing and/or, optionally, also of the outer toothing is carried out on an individual machining station. Therefore, two machining stations are omitted compared to the prior art.

According to a further preferred embodiment, the tooth flanks of the first smoothing gear have a depth crowning. A profile is referred to as depth-crowned when it is modified convexly with pronounced tip relief and root relief. As a result of the depth crowning of the first smoothing gear, the flank portions in the vicinity of the pitch circle of the inner toothing are smoothed.

According to a further preferred embodiment, the tooth profile of the second smoothing gear has a root relief through which the root region of the inner toothing is smoothed.

According to a further preferred embodiment, the tooth profile of the third smoothing gear has a tip relief through which the tooth tip of the inner toothing can be machined.

According to a further preferred embodiment, the component part is formed as a ring gear with an inner toothing or as a sun gear ring, as it is called, with inner toothing and outer toothing. In this second alternative, the component part acts as a ring gear on the one hand and as a sun gear (with outer toothing) on the other hand. In this case, the smoothing gears are arranged both inside and outside of the sun gear ring so that a twofold smoothing process, i.e., once for the inner toothing and once for the outer toothing, takes place simultaneously or consecutively.

According to a further aspect of the invention, in a method for producing an inner toothing and/or outer toothing, the inner toothing and/or outer toothing are/is produced initially by a cutting process, for example, broaching, slotting or cutting, in a first method step and are machined by soft-smoothing, i.e., by a deformation process, in a second method step immediately following the first method step. "Immediately following" means in this case that the material is deformed in the "soft", i.e., not yet surface-hardened, condition. In this respect, it is advantageous that relatively slight deforming forces are required and, therefore, the macrogeometry is not altered. By combining these two method steps, namely, a first, cutting machining and a second, deforming machining, a relatively high surface quality is achieved with low process-related expenditure. As a result of the surface quality achieved, micropitting, i.e., premature wear during operation of the meshing planet gears, is prevented.

During soft-smoothing, an apparatus is used in which the workpiece to be machined is not tightly clamped into the apparatus but rather rests loosely on a support during smoothing. At least one—preferably all—of the tools (smoothing gears) of the apparatus having a respective thrust ring that limits the axial movements of the workpiece that occur during smoothing due to the occurring radial forces.

According to a preferred variant of the method, the process of soft-smoothing is divided between different zones of the tooth profile, and the zones adjoin one another and possibly overlap. Preferably, three zones, namely, the flank regions between the tip and root of the tooth, and the flank regions near the tip and near the root of the tooth, are smoothed separately at the same time (synchronously). Given sufficient space, the quantity of machining zones may be increased beyond three. Further, there is the advantage of a shorter machining duration.

According to a further preferred variant, the method according to the invention for soft-smoothing is advantageously implemented on the apparatus according to the invention.

Due to the radial pressing force described above, particularly with ring gears having helical inner teeth and also with spur gears having helical outer teeth, an axial force occurs that could lift the loosely clamped workpiece from its support and therefore cause the latter to disengage. In order to counter this effect and to improve the machining results, it can be provided in this method that in case of helical-toothed workpieces the rotating direction is changed after a 360-degree revolution of the component part to be smoothed.

BRIEF DESCRIPTION OF THE DRAWINGS

Embodiment examples of the invention are shown in the drawings and described more fully in the following. Further features and/or advantages can be gathered from the description and/or the drawings. The drawings show:

FIG. 1 is a schematic view of an apparatus according to the invention for smoothing an inner toothing;

FIG. 2 is a further apparatus according to the invention for smoothing an inner toothing and an outer toothing.

DETAILED DESCRIPTION OF THE PRESENTLY PREFERRED EMBODIMENTS

Figure 1B:
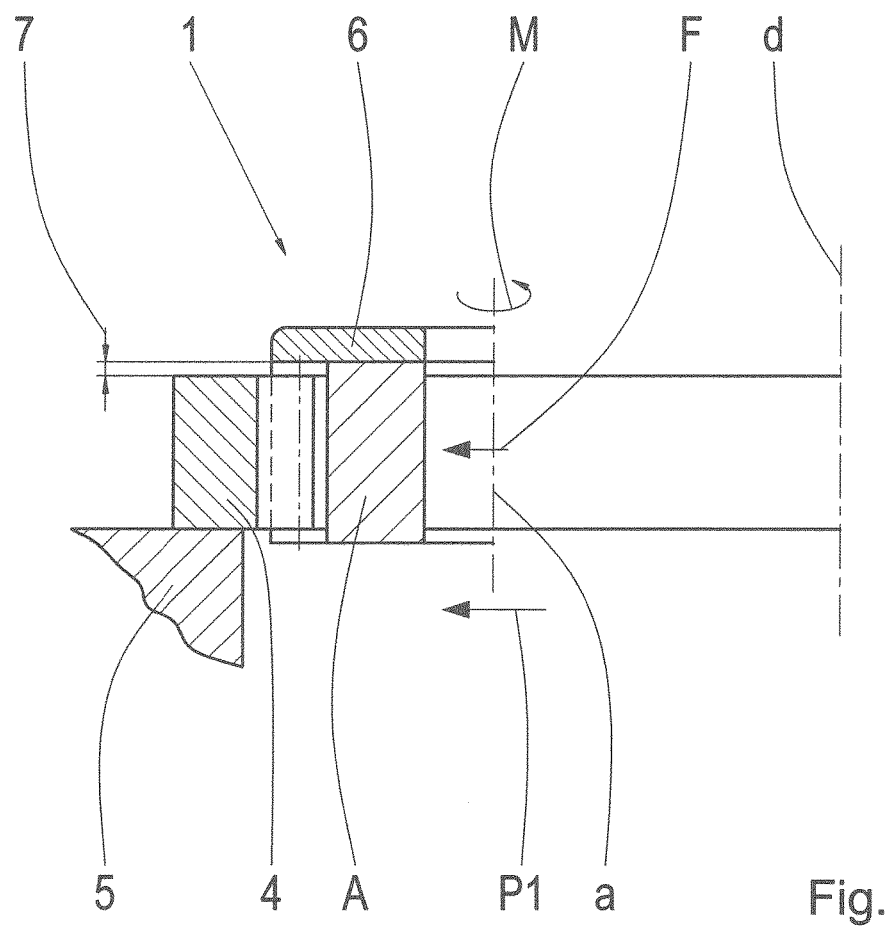
FIG. 1B is a detail of the apparatus according to the invention from FIG. 1.

FIG. 1 shows a schematic top view of a first embodiment example of the invention, namely, an apparatus 1 for smoothing an inner toothing. The apparatus 1 comprises a first tool slide 2, referred to as slide 2 for the sake of brevity, which is movable in direction of arrow P1 and a second tool slide 3, referred to as slide 3 for the sake of brevity, which is movable in direction of arrow P2. A first smoothing gear A, referred to hereinafter as smoothing wheel A, is mounted on the first slide 2 around a rotational axis a which is arranged perpendicular to the drawing plane. A second smoothing gear B is arranged on the second slide 3 so as to be rotatable around a rotational axis b and a third smoothing gear C is arranged on the second slide 3 so as to be rotatable around a rotational axis c. The smoothing gears A, B, C are tools of the apparatus 1 and have hardened involute teeth (no reference numeral) on their circumference. The first smoothing gear A which has a rigidly arranged rotational axis a is driven by a motor, not shown. The rotational axes b, c of the second smoothing gear B and third smoothing gear C are arranged in a floating manner, i.e., they can follow the course of the tooth gap. A component part 4, the workpiece, which is formed as a ring gear 4 is arranged above the two slides 2, 3 and is freely disposed on a plate, not shown. The ring gear 4 has an inner toothing formed as an involute toothing that is machined by broaching. The inner toothing 4a is preferably formed as helical teeth produced by helical broaching, i.e., by a helical movement of the broaching tool. The smoothing gears A, B, C are arranged inside the ring gear 4 similar to planet gears in a planetary gearset, engage by their outer teeth in the inner toothing 4a of the ring gear 4 and accordingly also cause the freely disposed ring gear 4 to be centered. An adjusting device, not shown, preferably a pneumatic cylinder is arranged between the first slide 2 and the second slide 3 and moves the two slides 2, 3 apart so as to apply the required pressing force between the smoothing gears A, B, C and the inner toothing 4a.

The smoothing process is soft-smoothing that proceeds in the following manner: The ring gear 4 is placed on the apparatus 1 immediately after the broaching process, i.e., in "soft" condition (without being surface-hardened). In so doing, the smoothing gears A, B, C are still in their retracted position, i.e., not engaged with the inner toothing 4a—the slides 2, 3 are still moved together. After the ring gear 4 is positioned on the apparatus 1, the smoothing gears A, B, C are meshed to the inner toothing 4a by moving slides 2, 3 apart from one another; only a relatively small pressing force need be applied. The first smoothing gear A then drives the ring gear 4, while the second smoothing gear B and third smoothing gear C roll along the inner toothing 4a. Owing to the floating axes b, c, the smoothing gears B, C can follow the inner toothing 4a in an optimal manner.

The toothing microgeometry of the three smoothing gears A, B, C can be varied to achieve optimal smoothing results in certain flank regions. Geometry variations of this type can be carried out in vertical direction of the tooth as profile angle correction (pressure angle corrections, preferably in the range of approximately ±0° 30'), as profile crowning (preferably in the range of from −20 to +30 μm) and as a combination of these parameters. In the horizontal direction of the tooth, these kinds of geometry variations can be carried out as flank angle corrections (preferably in the range of approximately ±0° 10'), as width crowning (preferably in the range of from −30 to +50 μm) and as a combination of these parameters. Additionally, variations in geometry in the vertical direction of the tooth and in the horizontal direction of the tooth can be combined or overlapped.

Correspondingly, different profile corrections are provided at the teeth of the smoothing gears A, B, C in the embodiment example shown in FIG. 1. The tooth profile of the first smoothing gear A has a depth crowning; the tooth profile of the second smoothing gear B has a comparatively large root relief, and the tooth profile of the third smoothing gear C has a comparatively large tip relief. Therefore, the three smoothing gears machine or smooth different regions or zones of the inner toothing 4a, namely the flank middle, the root, and the tip. By the smoothing process, particularly profile peaks that occur on the surface of the inner toothing 4a as a result of the broaching process are leveled through deformation of the still "soft" material so as to provide an improved surface quality with increased material contact area. The toothing of the ring gear 4 can be hardened after the soft-smoothing.

The axial drift effect in a helically toothed ring gear is effectively combatted in that a supporting ring limiting the axial movement of the ring gear is arranged at the smoothing gears which also have helical teeth. This will be explained more fully in the following referring to FIG. 1B. Another possibility for countering this effect and improving the machining results is to alternately reverse the rotating direction of the workpiece to be machined during smoothing.

FIG. 1B shows a detail of the embodiment example of an apparatus according to the invention described with reference to FIG. 1. FIG. 1B shows a cross section through the apparatus 1 provided for smoothing an inner toothing and/or outer toothing. The workpiece which is constructed in this case as ring gear 4, by way of example, lies loosely on a preferably hardened support 5 and, as is indicated by arrow P1, is meshed to the smoothing gears, only one of which —smoothing gear A with its rotational axis a—is shown in cross section. The rotational axis of the ring gear 4 is designated by d.

In case of a helically toothed workpiece, the radial pressing force F and the driving torque M give rise to a resultant axial force component that presses the workpiece on the support 5 or raises the workpiece from the support 5 depending on the rotational direction. A thrust ring 6, which is preferably fashioned from hardened steel, is fixedly connected to the smoothing gear A and limits possible axial backlash 7 to a few tenths of a millimeter. Preferably, only one of the smoothing gears is driven; in the present embodiment example, smoothing gear A is driven. The inclined position of the ring gear 4 resulting from the driving smoothing gear A, which is preferably rigidly mounted, can be compensated by a floating bearing support of the rest of the smoothing wheels. As discussed above, a regular change in rotational direction, for example, after every 360-degree revolution of the workpiece, is advantageous for uniform machining results.

FIG. 2 shows a schematic top view of a second embodiment of the invention, namely, an apparatus 11 for smoothing an inner toothing and/or outer toothing. The same reference numerals, increased by ten, are used for similar parts. The apparatus 11 comprises a first slide 12 and a second slide 13 that can be moved toward or away from one another similar to the embodiment example according to FIG. 1. The first slide 12 has a driven smoothing gear Ai and the second slide 13 has two floating smoothing gears Bi, Ci. The workpiece, which is smoothed on the apparatus 11, is a component part 14 which is formed as a ring gear and sun gear and which has an inner toothing 14a and an outer toothing 14b. The inner toothing 14a is preferably produced by helical broaching, i.e., cutting, while the outer toothing 14b is produced, for example, by milling, i.e., likewise by cutting. For purposes of smoothing the outer toothing 14b, a drivable smoothing gear Aa is rotatably arranged on the first slide 12 and a smoothing gear Ba as well as a third smoothing gear Ca are rotatably arranged on the second slide 13. The outer teeth of the smoothing gears Aa, Ba, Ca, also called smoothing wheels hereinafter, mesh with the outer toothing 14b of the component part 14. When smoothing the outer toothing 14b, as is shown in FIG. 2, the two slides 12, 13 are accordingly moved toward one another to generate the pressing force for the smoothing process. The two slides 12, 13 are subsequently moved apart so that the outer smoothing gears Aa, Ba, Ca disengage and the inner smoothing gears Ai, Bi, Ci mesh with the inner toothing 14a. The inner smoothing gears Ai, Bi, Ci and outer smoothing gears Aa, Ba, Ca are profile-corrected similar to the embodiment according to FIG. 1.

Due to the different profile geometries of the smoothing wheels, different regions or zones of the tooth flanks of the workpiece are machined, which also results in reduced deformation forces. Due to the above-mentioned profile corrections, the smoothing gears acting as tools have only a reduced line contact with the tooth flanks of the workpiece. This ensures the highest possible area pressure and, therefore, optimal machining results over the entire tooth flank of the workpiece. As has already been mentioned, the teeth of the workpieces are machined in unhardened condition, i.e., immediately following upon the broaching process. The smoothing results are the outcome of a superposition of the pressure and the rolling-sliding movement of the involute toothing. Accordingly, material bulges and roughness peaks (profile peaks) are smoothed out and tooth damage is eliminated.

The surface quality achieved by the disclosed apparatus and method can be characterized particularly by two surface parameters according to DIN EN ISO 4287, namely, the Rmr parameter, which describes the material contact area of the profile, and the Rsk parameter (skewness), which defines a surface having good bearing behavior, i.e., with a low profile peak count. The surface of the tooth flanks showed a significant improvement in these two parameters after soft-smoothing.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An apparatus for smoothing an inner toothing and/or an outer toothing of a component part, comprising:
    at least two adjustable smoothing gears configured engage in the inner toothing and/or outer toothing, the at least two adjustable smoothing gears are rotatably arranged inside the inner toothing and/or outside of the outer toothing,
    a thrust ring connected to at least one of the at least two adjustable smoothing gears and configured to limit axial movement of the component part,
    wherein the component part is not firmly clamped in the apparatus during smoothing.

2. The apparatus according to claim 1, wherein each of the at least two adjustable smoothing gears has a respective thrust ring.

3. The apparatus according to claim 1, wherein three smoothing gears are provided that are arranged offset relative to one another in each instance by 120°.

4. The apparatus according to claim 1, wherein at least one smoothing gear is arranged on a movable slide.

5. The apparatus according to claim 3, wherein a first smoothing gear is arranged on a first slide and a second smoothing gear and a third smoothing gear are arranged on a second slide, wherein the first slide and the second slide are displaceable opposite one another.

6. The apparatus according to claim 5, wherein the second smoothing and the third smoothing gear are mounted in a rotatable and floating manner relative to the second slide.

7. The apparatus according to claim 5, wherein the first smoothing gear is rotatably mounted with respect to the first slide and configured to be driven in rotational direction.

8. The apparatus according to claim 1, wherein teeth of each of the at least two adjustable smoothing gears have different tooth profiles.

9. The apparatus according to claim 8, wherein a profile angle correction in the range of ±0°30' and/or a profile crowning in the range of from −20 to +30 μm is provided at one of the at least two adjustable smoothing gears at the tooth profiles thereof considered in vertical direction of the tooth.

10. The apparatus according to claim 8, wherein a flank angle correction in the range of ±0°10' and/or a width crowning in the range of from −30 to +50 μm is provided at one of the at least two adjustable smoothing gears at the tooth profiles thereof considered in horizontal direction of the tooth.

11. The apparatus according to claim 8, wherein tooth flanks of a first smoothing gear has a depth crowning.

12. The apparatus according to claim 11, wherein a tooth profile of a second smoothing gear has a root relief.

13. The apparatus according to claim 12, wherein a tooth profile of a third smoothing gear has a tip relief.

14. The apparatus according to claim 1, wherein the component part is a ring gear with an inner toothing or as a sun gear ring with an inner toothing and an outer toothing.

15. A method for producing an inner toothing and/or outer toothing at a component part, comprising
    forming the inner toothing and/or the outer toothing by a cutting process;
    machining the inner toothing and/or the outer toothing by soft-smoothing immediately following the forming, wherein the soft-smoothing is carried out with an apparatus comprising:
    at least two adjustable smoothing gears configured engage in the inner toothing and/or outer toothing, the at least two adjustable smoothing gears are rotatably arranged inside the inner toothing and/or outside of the outer toothing,
    a thrust ring connected to at least one of the at least two adjustable smoothing gears and configured to limit axial movement of the component part,
    wherein the component part is not firmly clamped in the apparatus during smoothing.

16. The method according to claim 15, wherein the soft-smoothing is carried out simultaneously in different zones of the tooth profile of the component part that adjoin one another.

17. The method according to claim 16, wherein a flank region between the tip and root of the tooth is smoothed as first zone.

18. The method according to claim 17, wherein the tip region of the tooth is smoothed as second zone.

19. The method according to claim 18, wherein the root region of the tooth is smoothed as third zone.

* * * * *